Jan. 20, 1925.　　　　　　　1,523,987
C. C. SPREEN
POWER TRANSMISSION
Filed Jan. 5, 1924　　　2 Sheets-Sheet 1
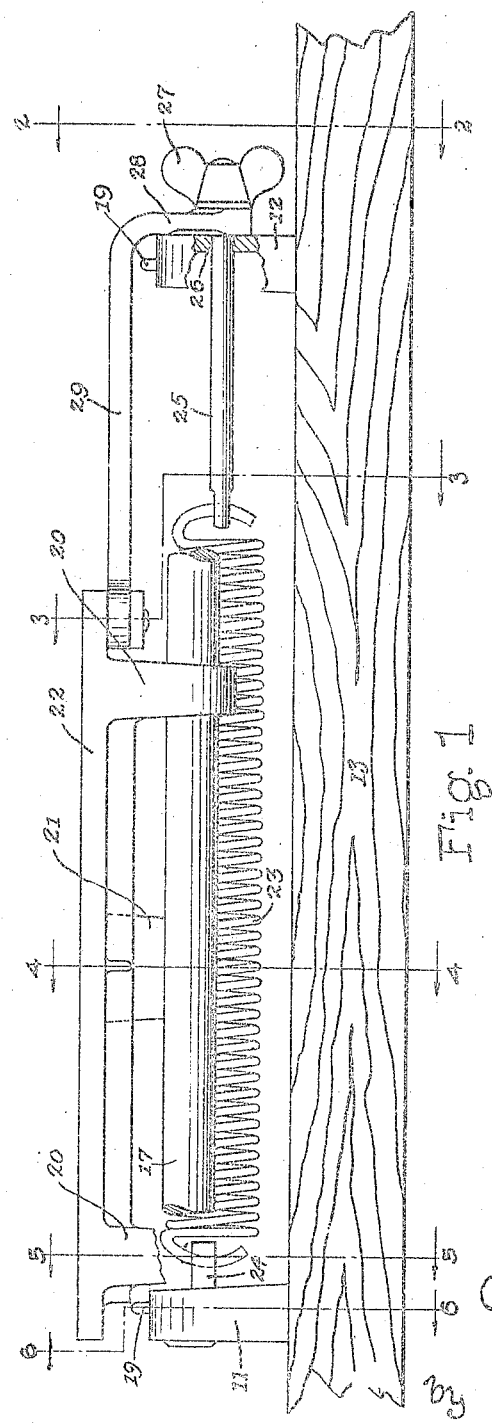
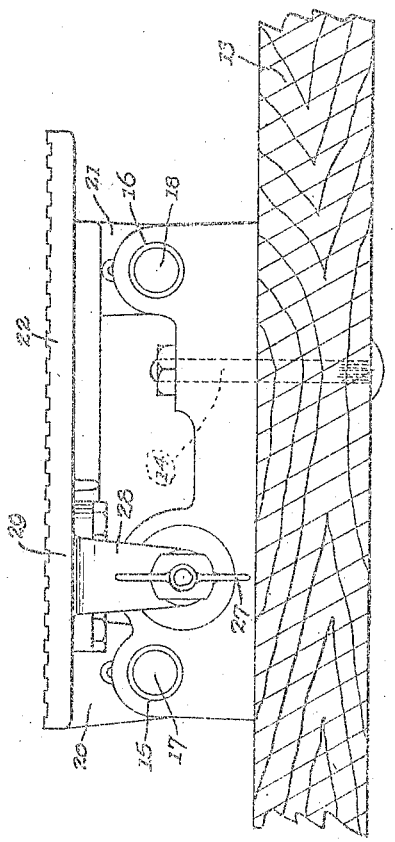
Charles C. Spreen,
Inventor
By Smith and Freeman
Attorneys

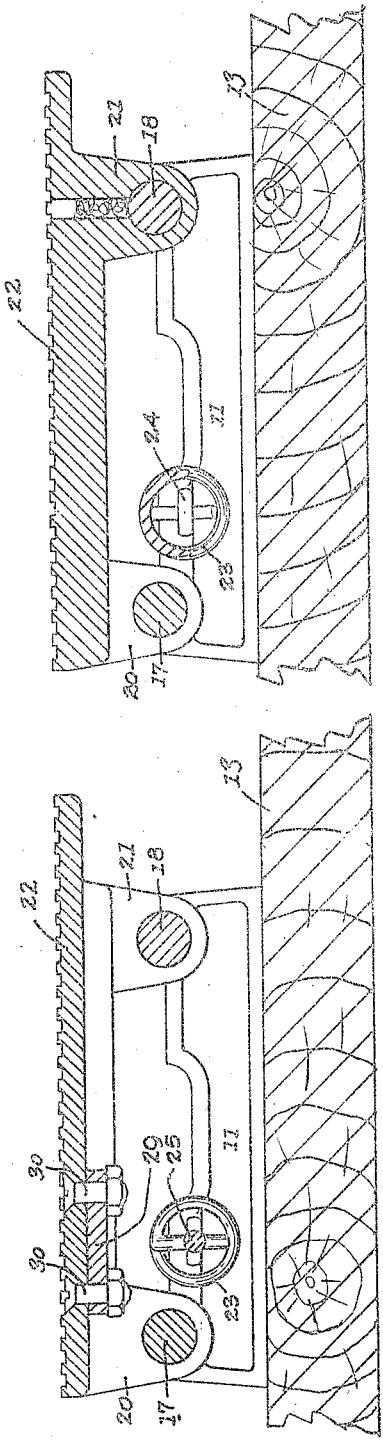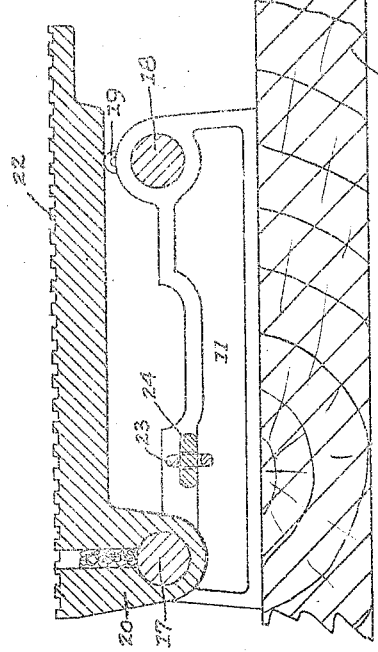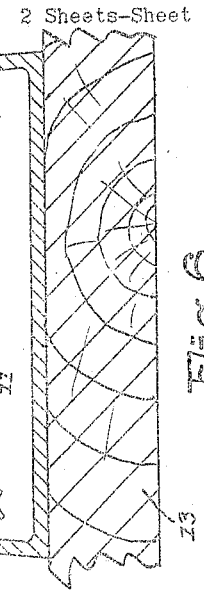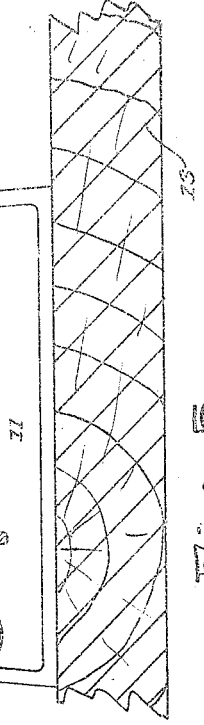

Patented Jan. 20, 1925.

1,523,987

UNITED STATES PATENT OFFICE.

CHARLES C. SPREEN, OF DETROIT, MICHIGAN, ASSIGNOR TO KELVINATOR CORPORATION, OF DETROIT, MICHIGAN, A CORPORATION OF DELAWARE.

POWER TRANSMISSION.

Application filed January 5, 1924. Serial No. 684,656.

*To all whom it may concern:*

Be it known that I, CHARLES C. SPREEN, a citizen of the United States, residing at Detroit, in the county of Wayne and State of Michigan, have invented a certain new and useful Improvement in Power Transmissions, of which the following is a full, clear, and exact description, reference being had to the accompanying drawings.

My invention relates to power transmission and the principal object of my invention is to provide new and improved means for maintaining tight a belt connecting two or more machine elements. In the drawings accompanying this specification and forming a part thereof I have shown, for purposes of illustration, one form which my invention may assume. In these drawings:

Figure 1 is a side elevation of this illustrative embodiment of my invention, while Figures 2, 3, 4, 5, and 6 are sections respectively on the lines 2—2, 3—3, 4—4, 5—5, and 6—6 of Figure 1.

The device herein shown comprises a pair of end plates 11 and 12 secured to a base 13 in any suitable manner as by means of bolts 14 and each provided with a pair of apertures 15 and 16 adapted to receive respectively a pair of guide rods 17 and 18 which are secured in position within the receptacles 15 and 16 by means of suitable cotter pins 19. Mounted upon these rods 17 and 18 by means of a pair of ears 20 encircling the rod 17 and a single ear 21 encircling the rod 18 is a movable base 22 arranged to support any desired article of machinery. Positioned beneath the movable base 22 and between the guide rods 17 and 18 is a spring 23 tensioned between the fixed base 13 and the movable base 22, connected to the fixed base 13 by means of a lug 24 extending from the end plate 11, and connected to the movable base 22 by means of a shank 25 passing through an aperture 26 in the end plate 12 and, by means of a nut 27 screw threaded to the shank 25, adjustably engaging the face of the depending portion 28 of an arm 29 projecting from the movable base 22 and secured thereto by means of a pair of bolts 30.

It will be obvious from the above description that the spring 23 will act to constantly urge the movable base toward the position in which it is herein shown and that the force with which the spring acts may be readily varied by adjusting the position of the nut 27 along the shank 25. It will also be obvious to those skilled in the art that the particular embodiment of my invention herein shown and disclosed may be variously changed and modified without sacrificing the advantages of my invention or departing from the spirit thereof and it will therefore be understood that the disclosure herein is illustrative only and that my invention is not limited thereto.

I claim:

In combination, a fixed base provided with a pair of ends connected by a pair of guide rods, a movable base reciprocably supported on said guide rods, an ear depending from one end of said movable base, a shank adjustably secured to said ear and extending beneath said movable base in the direction of movement of said movable base, and a tension spring extending in the same direction as said shank from the inner end of said shank to a part of said fixed base remote from said shank.

In testimony whereof, I hereunto affix my signature.

CHARLES C. SPREEN.